(12) United States Patent
Schäfer et al.

(10) Patent No.: US 11,253,055 B2
(45) Date of Patent: Feb. 22, 2022

(54) PERSONAL HYGIENE DEVICE WITH TREATMENT FORCE MEASUREMENT UNIT

(71) Applicant: Braun GmbH, Kronberg (DE)

(72) Inventors: Robert Schäfer, Kronberg (DE); Felix Merten, Oberursel (DE)

(73) Assignee: Braun GmbH, Kronberg (DE)

( * ) Notice: Subject to any disclaimer, the term of this patent is extended or adjusted under 35 U.S.C. 154(b) by 30 days.

(21) Appl. No.: 16/387,056

(22) Filed: Apr. 17, 2019

(65) Prior Publication Data

US 2019/0320786 A1 Oct. 24, 2019

(30) Foreign Application Priority Data

Apr. 18, 2018 (EP) .................................... 18167926

(51) Int. Cl.
*A61C 17/00* (2006.01)
*A46B 15/00* (2006.01)
(Continued)

(52) U.S. Cl.
CPC ............ *A46B 15/0012* (2013.01); *A46B 9/04* (2013.01); *A46B 15/0046* (2013.01);
(Continued)

(58) Field of Classification Search
CPC ........ A46B 15/0002; A46B 2200/1066; A46B 15/0042; A46B 9/04; A46B 15/046;
(Continued)

(56) References Cited

U.S. PATENT DOCUMENTS 7,381,494 B2 * 6/2008 Fong ....................... H01M 2/06
429/163
2012/0295216 A1 11/2012 Dykes
(Continued)

FOREIGN PATENT DOCUMENTS

CN 1409865 A 4/2003
CN 1529890 A 9/2004
(Continued)

OTHER PUBLICATIONS

European Search Report dated Oct. 16, 2018, 9 pages.
International Search Report and Written Opinion; Application Ser. No. PCT/IB2019/053087; dated Jul. 31, 2019; 15 pages.

*Primary Examiner* — Katina N. Henson
(74) *Attorney, Agent, or Firm* — Vladimir Vitenberg

(57) ABSTRACT

A toothbrush has a handle and a treatment head mounted for movement relative to the handle against a spring force when a treatment force is applied in at least one treatment direction onto the treatment head. A treatment force measurement unit for determining the applied treatment force includes a capacitive force senor having a first electrode fixedly mounted with respect to the handle and a second electrode mounted at a distance from the first electrode. The second electrode is movably mounted with respect to the handle. A spring unit is arranged between the first and the second electrode. A control circuit determines at least one parameter indicative of the capacitance between the first and second electrodes, wherein the second electrode is mechanically coupled with the treatment head and is arranged to be moved relative to the first electrode when the treatment force is applied at the treatment head.

21 Claims, 7 Drawing Sheets

(51) Int. Cl.
*A46B 9/04* (2006.01)
*A61C 17/22* (2006.01)
*A61C 17/16* (2006.01)
*A61C 17/34* (2006.01)

(52) U.S. Cl.
CPC ....... *A46B 15/0006* (2013.01); *A46B 15/0044* (2013.01); *A61C 17/00* (2013.01); *A61C 17/16* (2013.01); *A61C 17/221* (2013.01); *A61C 17/225* (2013.01); *A61C 17/34* (2013.01)

(58) Field of Classification Search
CPC . A46B 15/0006; A46B 15/004; A46B 15/008; A47L 1/06; A61B 5/038; A61C 17/34; A61C 17/16; A61C 17/221; A61C 17/00
USPC ....................................... 15/105, 22.1, 167.1
See application file for complete search history.

(56) References Cited

U.S. PATENT DOCUMENTS

| | | |
|---|---|---|
| 2014/0310900 A1 | 10/2014 | Curry |
| 2015/0088538 A1 | 3/2015 | Dykes |
| 2016/0331120 A1 | 11/2016 | Scheele et al. |

FOREIGN PATENT DOCUMENTS

| | | | |
|---|---|---|---|
| CN | 102971814 A | | 3/2013 |
| CN | 106667610 | | 5/2017 |
| CN | 106667610 A | * | 5/2017 |
| FR | 2832298 | | 5/2003 |
| JP | 2004172504 A | | 6/2004 |

* cited by examiner

PERSONAL HYGIENE DEVICE WITH TREATMENT FORCE MEASUREMENT UNIT

FIELD OF THE INVENTION

The present disclosure is concerned with a personal hygiene device having a treatment head that is arranged to move relative to a handle under an applied treatment force and in particular where the personal hygiene device has a treatment force measurement unit to determine the force applied at the treatment head.

BACKGROUND OF THE INVENTION

Personal hygiene devices having the above described arrangement are known. E.g. document EP 3 092 974 A1 describes a personal hygiene device having a handle, a treatment head mounted for relative movement of at least a portion of the treatment head with respect to the handle against a restoring force when a treatment force is applied in at least one direction onto the treatment head. The personal hygiene device further comprises a treatment force measurement unit for determining the applied treatment force, which treatment force measurement unit has a light emitting element, a light sensitive element, and a light changing element arranged at least partly in the light path between the light emitting element and the light sensitive element. The light changing element is arranged to be moved relatively to the light emitting element and light sensitive element when at least the portion of the treatment head mounted for relative movement is moved under an applied treatment force.

Such an arrangement as described in EP 3 092 974 A1 is relatively sensitive to manufacturing tolerances, in particular as a large manufacturing tolerance may render the measurement unit unfit for use, and the measurement unit also requires a certain relatively large construction volume (where here large in particular refers to the extension in all three dimensions) that needs to be fitted into a typically small-sized handle of a personal hygiene device.

Hence, there is a need to improve the known personal hygiene devices at least with respect to one of sensibility to manufacturing tolerances and suitability of the needed construction volume for a treatment force measurement arrangement.

SUMMARY OF THE INVENTION

In accordance with an aspect a personal hygiene device is provided, in particular a toothbrush, having a handle, a treatment head mounted for movement relative to the handle against a spring force when a treatment force is applied in at least one treatment direction onto the treatment head, a treatment force measurement unit for determining the applied treatment force comprising a capacitive force senor having a first electrode, which in particular is fixedly mounted with respect to the handle, a second electrode mounted at a distance to the first electrode, which second electrode is movably mounted with respect to the handle, a spring unit being arranged between the first and the second electrode, and a control circuit for determining at least one parameter indicative of the capacitance between the first electrode and the second electrode, wherein the second electrode is mechanically coupled with the treatment head and is arranged to be moved relative to the first electrode when the treatment force is applied at the treatment head.

BRIEF DESCRIPTION OF THE DRAWINGS

The present disclosure is further elucidated by a detailed description of example embodiments and by reference to figures. In the figures

DETAILED DESCRIPTION OF THE INVENTION

Figure 1:
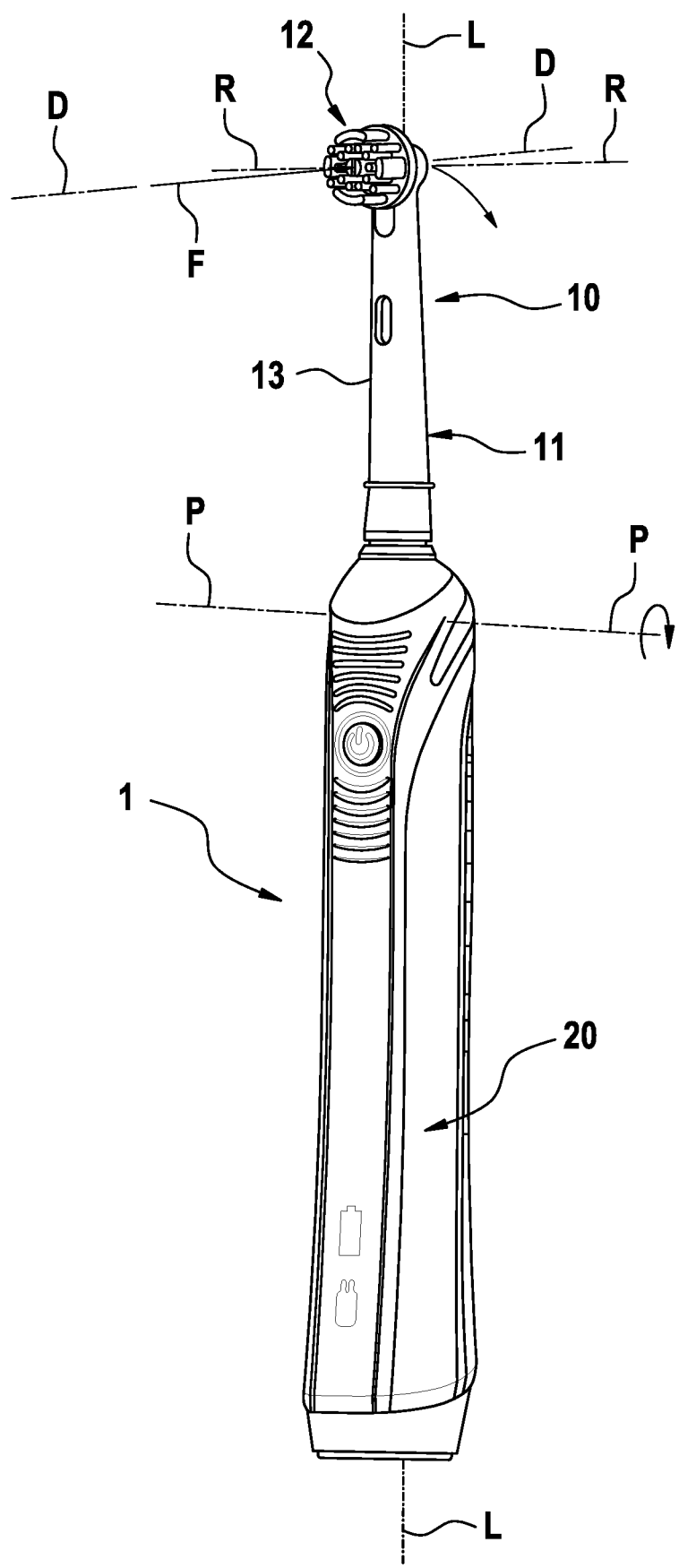
FIG. 1 is a depiction of an example personal hygiene device realized as an electric toothbrush.

In the context of the present description "personal hygiene" shall mean the nurture (or care) of the skin and of its adnexa (i.e. hairs and nails) and of the teeth and the oral cavity (including the tongue, the gums etc.), where the aim is on the one hand the prevention of illnesses and the maintenance and strengthening of health ("hygiene") and on the other hand the cosmetic treatment and improvement of the appearance of the skin and its adnexa. It shall include the maintenance and strengthening of wellbeing. This includes skin care, hair care, and oral care as well as nail care. This further includes other grooming activities such as beard care, shaving, and depilation. A "personal hygiene device" thus means any device for performing such nurturing or grooming activity, e.g. (cosmetic) skin treatment devices such as skin massage devices or skin brushes; wet razors; electric shavers or trimmers; electric epilators; and oral care devices such as manual or electric toothbrushes, (electric) flossers, (electric) irrigators, (electric) tongue cleaners, or (electric) gum massagers. This shall not exclude that the proposed personal hygiene system may have a more pronounced benefit in one or several of these nurturing or device areas than in one or several other of these areas.

A personal hygiene device as proposed comprises a treatment head for performing an intended nurturing procedure. The treatment head may be actively driven (by means of a drive unit) or may be energized—it is then referred to as an electric personal hygiene device instead of a manual personal hygiene device. In the case of a manual personal hygiene device, the treatment head is neither actively driven (it may manually be moved by the user like a manual toothbrush or a wet razor) nor energized. An electric toothbrush is one example of an electric personal hygiene device, in particular an example of the group of electric oral care devices. A light-based skin treatment device is another example of an electric personal hygiene device having a treatment head that is energized (so that the light source can emit light for the intended skin treatment). A manual toothbrush is an example of a manual personal hygiene device, in particular an example of the group of manual oral care devices.

In accordance with the present disclosure, the personal hygiene device comprises as part of a "treatment force measurement unit" a "capacitive force measurement unit" or "capacitive force sensor" to enable determination of the treatment force applied at the treatment head of the personal hygiene device. The capacitive force sensor comprises two conductive plate-like electrodes that are arranged opposite to each other in an essentially congruent manner so that a plate capacitor is formed. The first electrode may be provided as an electrode that is fixed with respect to the handle, even though it is not necessary for the here described concept that the first electrode is fixed. The second electrode is provided as a moveable electrode (i.e. moveable with respect to the handle and in particular with respect to the first electrode) so that the plate capacitor becomes a variable capacitor as its capacitance changes in dependence on the distance between the first and second electrodes. In the following, the depicted and discussed examples show a first electrode that is fixed with respect to the handle and it may then also be referred to the first electrode as the fixed electrode. But, as said, the first electrode may also be moveable, e.g. it may be mounted with respect to the handle by means of a spring element. In particular, the first electrode may be mounted at a structure that is essentially fixedly mounted in the handle, but this structure may slightly move when a force is applied at it (which force may in particular be applied by the spring unit arranged between the first and the second electrode). Due to the small distance changes relevant for the herein discussed force sensor, the first electrode is then also "moveable". As long as the distances the first and the second electrode make is essentially strictly depending on the applied treatment force and as long as their movement leads to a change in distance between the first and second electrodes, the force sensor performs its function. Hence, when the first electrode is referred to as the fixed electrode, it may also be referred to the second electrode as the moveable electrode. It is s clear that the second electrode is always moveable with respect to the first (or fixed) electrode and both terms are synonymously used herein. The term "fixed electrode" may be used instead of "first electrode" in case the first electrode is fixedly arranged with respect to the handle.

The capacitance C of the plate capacitor formed by the two opposing first and second electrodes is given by the known formula $C=\varepsilon_0 \cdot A/d$, where $\varepsilon_0$ is the electric constant ($\varepsilon_0 \approx 8.854 \cdot 10^{-12}$ As/Vm), A is the area of the opposing electrodes, and d is the distance between the electrodes (it is assumed that only air is present between the electrodes so that the relative permittivity $\varepsilon_r$ is essentially $\varepsilon_r=1$). The second or moveable electrode is mounted via a spring unit with respect to the handle (which means that it may either be mounted by this spring unit at the handle or at a structure that is fixedly arranged relative to the handle), so that a force acting on the moveable electrode plate in a direction towards the first electrode moves the moveable electrode against the restoring force of the spring unit towards the first electrode, which shall not exclude that the distance between the electrodes may also be increased upon application of the treatment force. As is obvious from the formula above, the capacitance of the plate capacitor changes inversely proportional when the distance between the electrode plates is changed. The variable plate capacitor may now be arranged as a part of an RC or LC oscillating circuit, whose resonance frequency changes in accordance with the changing capacitance. A microcontroller may be arranged to measure the resonance frequency of the oscillating circuit in order to determine a parameter indicative of the capacitance of the plate capacitor formed by the opposing electrode plates. In some embodiments, the resistor forming a part of the RC oscillating circuit is an integral component of the microcontroller. The microcontroller may determine a parameter indicative of the resonance frequency of the RC (or LC) oscillation circuit (and hence thus determines a parameter indicative of the capacitance of the variable plate capacitor formed by the fixed and moveable electrode) by feeding the oscillating circuit with a periodic signal of varying frequency and by assessing the response of the oscillating circuit. A microcontroller to perform such determination may be chosen from the MSP430 series available from Texas Instruments Inc., Dallas, Tex., USA. The microcontroller and, if present, the resistor or coil of the RC or LC oscillating circuit form part of a control circuit. Of course, instead of a microcontroller, the control circuit may also comprise analog components instead of an integrated component. In case that the oscillating circuit is completely realized by analog or digital components not being a microcontroller, a microcontroller then only needs to provide a counting capability.

A plate capacitor as needed requires only a relatively small construction volume and may in particular have a 3-dimensional construction volume that has two relatively large extensions (e.g. the dimension of the electrode plates in their respective plane of extension, which dimension may be in the range of between 5 mm times 5 mm to 30 mm times 30 mm, in particular in a range of between 10 mm times 10 mm to 20 mm times 20 mm) and one relatively small extension (e.g. the distance between the electrode plates may be in the range of between 0.1 mm to 1.0 mm, in particular in the range of between 0.15 mm to 0.5 mm, and further in particular in the range of between 0.2 mm to 0.4 mm). The thickness of the electrode plates may be very small (e.g. the fixed electrode may be realized by a metallized area on a carrier) or small (e.g. the moveable electrode may be made from a conductive sheet having a thickness in the range of between 0.1 mm to 2.0 mm).

In case that the fixed electrode is arranged on a carrier (e.g. as a metallized layer), the carrier may be realized as a printed circuit board. Instead of a metallized layer, a metal sheet may be secured to the carrier to form the fixed plate. The moveable electrode may be as well secured to the carrier as well and a spring unit may be arranged between the movable electrode and the carrier.

As was already explained, the moveable electrode is mounted with respect to the fixed electrode via a spring unit so that a restoring spring force is to be overcome to move the moveable electrode. The spring constant of the spring unit may be chosen so that the change in distance under an applied treatment force lies in a range of between 25 µm/N to 100 µm/N, in particular in a range of between 30 µm/N to 50 µm/N, and further in particular in a range of between 35 µm/N to 45 µm/N. The spring constant may be adapted to the particular circumstances.

The spring unit via which the moveable electrode is mounted relative to the fixed electrode, i.e. relative to the handle, may in particular be realized by spring arms that extend in the same plane as the moveable electrode in its rest position and further in particular by spring arms that are integral with the moveable electrode. The spring arms may be connected with pads that may be secured at a carrier, e.g. by welding of the pads to metallized regions on the carrier. The pads may in particular be integral with the spring arms.

In accordance with some embodiments, a force transmission element may be secured at a backside of the moveable electrode to define a point at which the treatment force is transferred to the moveable electrode. The force transmission element may be realized as a spherical object such as a glass sphere, but other realizations are contemplated as well. E.g. the moveable electrode may have an embossment, which embossment realizing the force transmission element projects from the backside of the moveable electrode. The force transmission element may in particular be connected with the movable electrode at about the center of area of the moveable electrode so that transmission of a force via the force transmission element will essentially not lead to an inclination of the movable electrode with respect to the fixed electrode. The movable electrode may also comprise a reinforcement structure to effectively suppress a deformation of the moveable electrode under a transmitted force.

The treatment head may be pivot mounted at or with respect to the handle so that application of the treatment force at the treatment head leads to a pivoting of the treatment head with respect to the handle against a spring force, which spring force is provided by the spring unit via which the movable electrode is mounted with respect to the handle, e.g. at a carrier that is secured at the handle. The pivot axis may in particular be perpendicular to a length extension direction of the personal hygiene device. As was mentioned in a previous paragraph, the movement of the movable electrode may be relatively small under an applied force, e.g. may be in a range of between 25 µm/N to 50 µm/N. If the maximum treatment force that shall be determined is about 4 N, then the movement of the moveable electrode would not be larger than 200 µm. That means that the motion of the treatment head may be in the same order of magnitude and is thus potentially hardly noticeable by a user.

The treatment head may comprise an arm portion that extends into the handle of the personal hygiene device and which arm portion comprises a contact face that is arranged for contacting the force transmission element. The contact face may be fixedly secured at the force transmission element, e.g. by gluing, welding, clamping, screwing or any other method known by a skilled person. Alternatively, the contact face may be biased against the force transmission element by means of a biasing element, e.g. a spring that extends between the handle (or any other part that is fixed with respect to the handle) and the treatment head so that a biasing force is applied that biases the contact face towards the force transmission element and sustains contact between the both even in case of vibrations or gravitational forces that may act from different directions, depending on the orientation of the personal hygiene device. It is noted here that the treatment head or at least a head portion of the treatment head may in particular be repeatedly detachable from and again attachable to the handle. E.g. the mentioned arm portion may always be connected with the handle, while a portion of the treatment head comprising a functional element for performing the treatment may then be realized as a replaceable part.

The treatment force measurement unit described herein, in particular the control circuit, may be used to control an indicator element to indicate to the user that, e.g., the applied treatment force is above a threshold force value (and may thus be too high for the intended use of the personal hygiene device). It is also possible to indicate that the applied treatment force is below a first threshold force value, is between the first and a second threshold force value, or is above the second threshold force value (and that the applied threshold force is thus below a recommended range, is in the recommended range, or is above the recommended range). The indicator element may be a light emission element such as a LED that is switched on or several LEDs that are switched on or off etc. The indicator element may also be chosen from the list of other visually detectable, audibly detectable, or tangibly detectable elements such as displays, beepers, or vibrators etc. Several indicator elements may be used as well. In contrast to a mere indication of one or several thresholds to the user, e.g. a display can be used to provide a more complex feedback to the user, e.g. a currently applied force value may be depicted on a scale ranging from very low to very high force values.

FIG. 1 is a depiction of an example personal hygiene device 1 in accordance with the present disclosure realized as an electric toothbrush. The personal hygiene device 1 comprises a treatment head 10 and a handle 20. The personal hygiene device 1 generally extends along a longitudinal extension direction L. The treatment head 10 is mounted with respect to the handle 20 so that under application of a treatment force F along a treatment direction D the treatment head 10 pivots relative to the handle 20 around a pivot axis P. The treatment head 10 may in particular have a rear portion or arm portion that extends inside of the handle 20. Here, the treatment head 10 comprises a detachable head portion 11 and an arm portion that extends into the handle 20, where the treatment head 10 is pivot mounted inside of the handle 20 to allow the pivoting motion of the treatment head 10 under application of the treatment force F. While the term "pivoting motion" is used, the motion itself may be essentially not recognizable by the user, e.g. the head portion 11 may only move one or a few tenth of a millimeter under application of a maximum treatment force as the spring constant of the spring unit against which the treatment has to be moved may be relatively high. The maximum treatment force that shall be measured by the personal hygiene device may be in the range of between 1 N and 10 N, in particular in a range of between 2 N and 6 N, further in particular in a range of between 3 N and 5 N. A stopper element may be provided that inhibits any further movement of the treatment head if the applied treatment force raises above the maximum treatment force (a stopper element may also be sensible to protect the device components in case a different high force acts on the treatment head such as a force generated when the personal hygiene is dropped to the floor). The head portion 11 is here realized as a replaceable portion that comprises as a functional element 12 for performing the treatment a brush head that is mounted at a treatment head tube 13 for driven movement around a rotation axis R.

Figure 2:
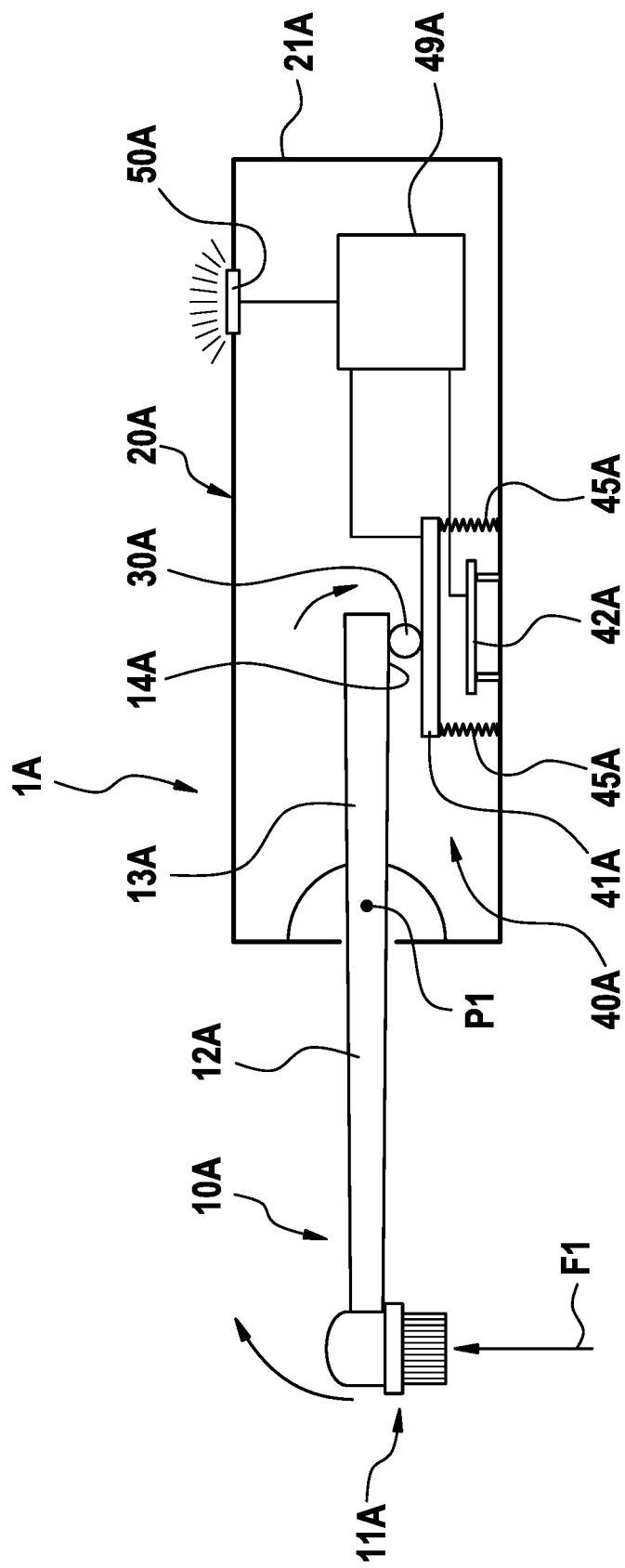
FIG. 2 is a schematic depiction of an example personal hygiene device comprising an example capacitive force measurement arrangement as proposed.

FIG. 2 is a schematic depiction of an example personal hygiene device 1A in accordance with the present disclosure. The personal hygiene device 1A comprises a treatment head 10A and a handle 20A. The treatment head 10A extends into a hollow handle housing 21A of the handle 20A and is pivot mounted so that the treatment head 10A can pivot around a pivot axis P1 under application of a treatment force F1 at a front portion 11A of the treatment head 10A. The personal hygiene device 1A further comprises a treatment force measurement unit 40A and an indicator element 50A coupled with the treatment force measurement unit 40A. The treatment head 10A has a front portion 12A that essentially extends outside of the handle housing 21A and a rear or arm portion 13A that extends within the handle housing 21A. The arm portion 13A has a contact face 14A that is in abutting contact with a force transmission element 30A that is disposed on a backside of a movable electrode 41A. The moveable electrode 41A is mounted via a spring unit 45A with respect to the handle 20A so that under application of a treatment force F1 the treatment head 10A pivots around pivot axis P1 against the restoring spring force provided by the spring unit 45A. The moveable electrode 41A is located opposite to a fixed electrode 42A, which fixed electrode 42A is fixedly mounted with respect to the handle 20A. While the spring unit is here shown to extend between the moveable electrode 41A and the handle housing 21A, the spring unit may also extend between the moveable electrode 41A and the fixed electrode 42A. In one embodiment, the spring unit 45A comprises at least two spring arms attached to the movable electrode 41A and arranged so that the fixed electrode 42A is disposed between the spring arms of the spring unit 45A. The treatment force measurement unit 40A further comprises a control circuit 49A that is connected with the moveable electrode 41A and the fixed electrode 42A and is arranged to measure at least one parameter that is indicative of the capacitance of the variable plate capacitor formed by the moveable electrode 41A and the fixed electrode 42A. The control circuit 49A is here coupled with an indicator element 50A to indicate to the user in at least one of a visually, audibly, or tangibly perceivable manner information about the applied treatment force.

Figure 3:
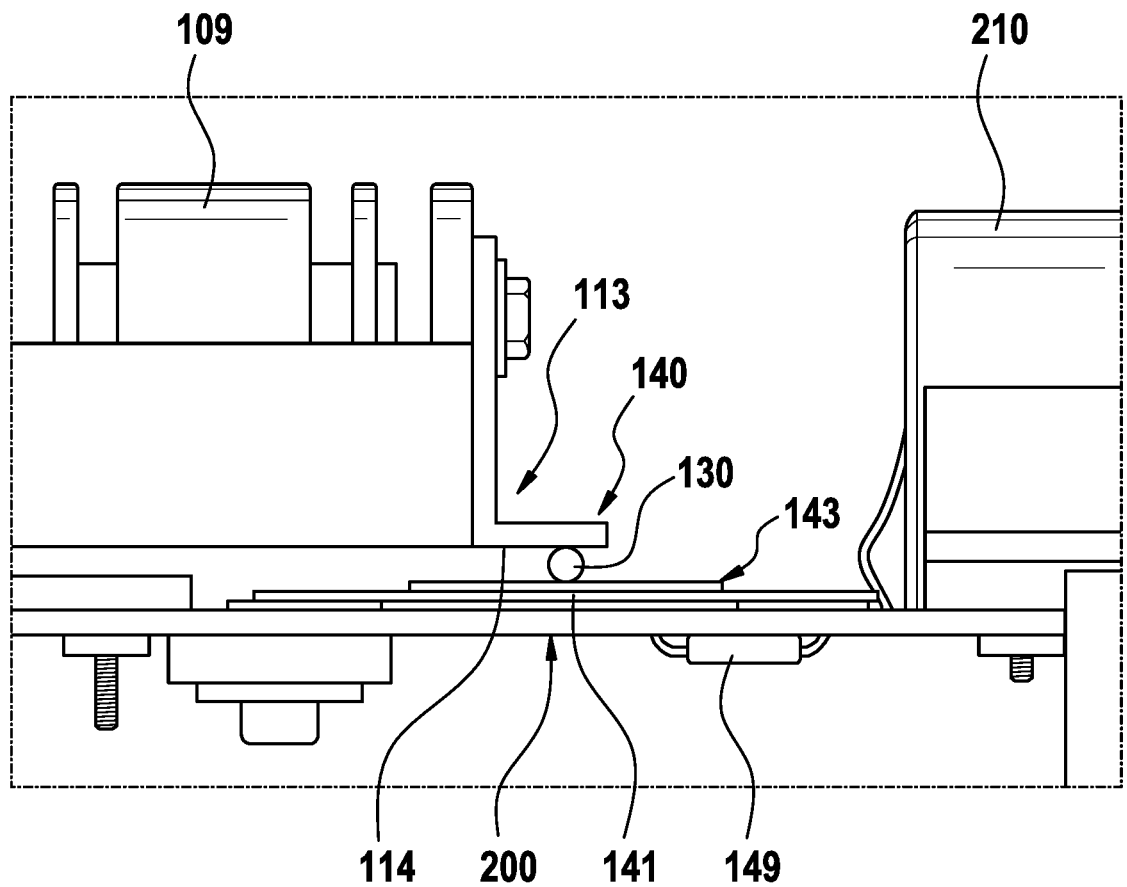
FIG. 3 is a depiction of a detail of a setup for measuring the force applied at a treatment head of a personal hygiene device.

FIG. 3 shows a detail view of a graphically depicted sample setup of a transmission force measurement unit 140 together with some other features of a personal hygiene device in accordance with the present description. An arm portion 113 of a treatment head carries in the shown embodiment also a drive 109 for driving a functional element of the treatment head relative to the treatment head (e.g. to drive a brush head as shown in FIG. 1). The arm portion 113 has an end portion that is essentially L-shaped and has on its bottom side a contact face 114 that is in contact with a force transmission element 130, which here is realized as a glass sphere. The force transmission element 130 is fixedly secured at a moveable electrode 141. As will be explained in more detail with respect to FIG. 4, the moveable electrode 141 is integral with a spring unit and two mounting pads, via which the moveable electrode 141 is mounted at a carrier 200, that here is realized as a PCB. The carrier 200 may carry various electronic and electric components such as a microcontroller 149 and a battery 210 that is partly shown in FIG. 3. A moveable electrode 141 is here fixedly connected with an enforcement structure 143 that is provided to reduce a deformation of the moveable electrode 141 when the applied treatment force is transmitted to the moveable electrode 141 via the force transmission element 130. A fixed electrode being essentially congruent with the moveable electrode is arranged on the carrier 200, but as the fixed electrode is realized as a metallized portion on the carrier 200, the fixed electrode is essentially not visible in this side view.

Figure 4:
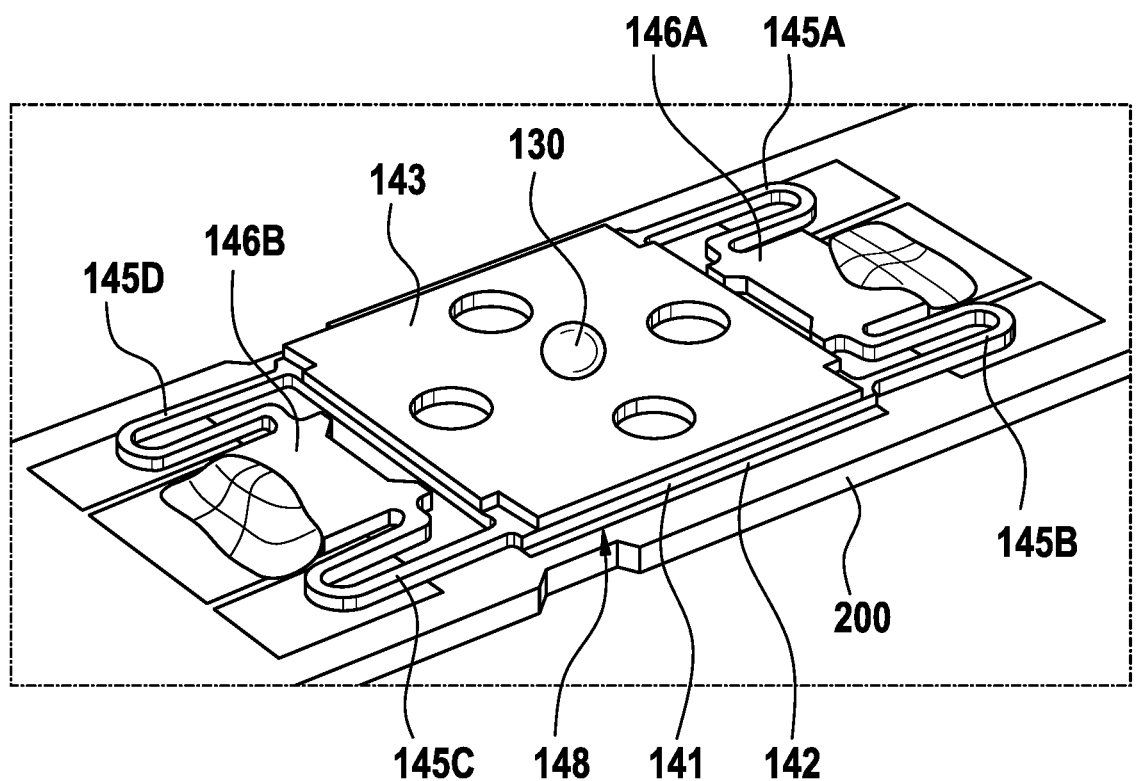
FIG. 4 is a depiction of a portion of an example capacitive force measurement unit comprising a first electrode and a second electrode.

FIG. 4 is a graphical depiction of the carrier 200 shown in FIG. 3 together with the variable plate capacitor formed by the moveable electrode 141 and the fixed electrode 142. The carrier 200 is here shown separate from the other features shown in FIG. 3 and also shown in a perspective view for enhanced visibility of the details of the setup. The fixed electrode 142 is here visible as a metallized region underneath the moveable electrode 141, the fixed electrode 142 being essentially congruent in shape and size with the moveable electrode 141. The moveable electrode 141 and the fixed electrode 142 together form a variable plate capacitor 148. E.g. the microcontroller 149 shown in FIG. 3 can be connected with the variable plate capacitor 148 to measure the capacitance of the variable plate capacitor 148 at a given point in time. An enforcement structure 143 is fixedly secured to the moveable electrode. The force transmission element 130 is fixedly secured at the enforcement structure 143 at a center of area point of the moveable electrode 141. The enforcement structure 143 here has four circular cut-outs, which were used in the assembly process. The moveable electrode 141 is integral with four spring arms 145A-145D that symmetrically extend from the four corners of the essentially square moveable electrode 141 such that on two opposite sides of the moveable electrode 141 two spring arms 145A, 145B and 145C, 145D, respectively, extend and which spring arms all have an identical S-shaped form. The two spring arms 145A, 145B and 145C, 145D on each of the sides end in one mounting pad 146A and 146B, respectively. The spring arms 145A and 145B here extend from the right-hand side of the moveable electrode 141 and are integral with the mounting pad 146A and the spring arms 145C and 146D extending from the left hand side of the moveable electrode 141 are integral with the mounting pad 146B. The mounting pads 146A, 146B are fixedly secured to metallized regions on the carrier 200 by means of soldering, which shall not exclude other connection means such as gluing, screwing etc. The material from which the moveable electrode 141 and the integral spring arms 145A-145D and the mounting pads 146A and 146B are made may be spring steel, spring bronze, plastic having a conductive coating, a conductive plastic compound etc. The capacitance of the variable plate capacitor is typically chosen to be lower than about 100 pF.

Figure 5:
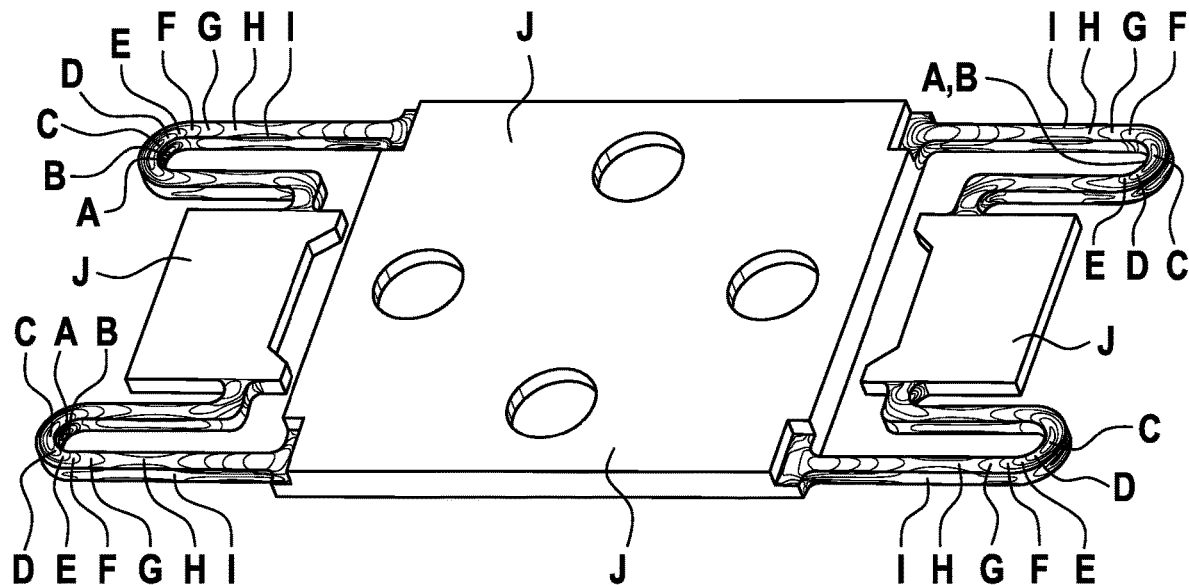
FIG. 5 is a depiction showing simulation results of the strain in the spring arms of the second electrode shown in FIG. 3 when a force is applied via the force transmission element.

FIG. 5 is a depiction of the results of an FEM simulation of the deformation of the spring arms of the integral moveable electrode-spring arms-mounting pas unit discussed with respect to FIGS. 3 and 4 under an applied force onto the moveable electrode. The specific form of the spring arms was chosen for relative insensitivity of the spring action under a tolerance of the positioning of the force transmission element. The spring arms prevent tilting of the moveable electrode when a non-central force is applied. Further, FEM simulations show that the spring arms having the here depicted design do not get into a state of plastic deformation under the typical forces that are applied, but always stay in the elastic deformation regime.

Figure 6:
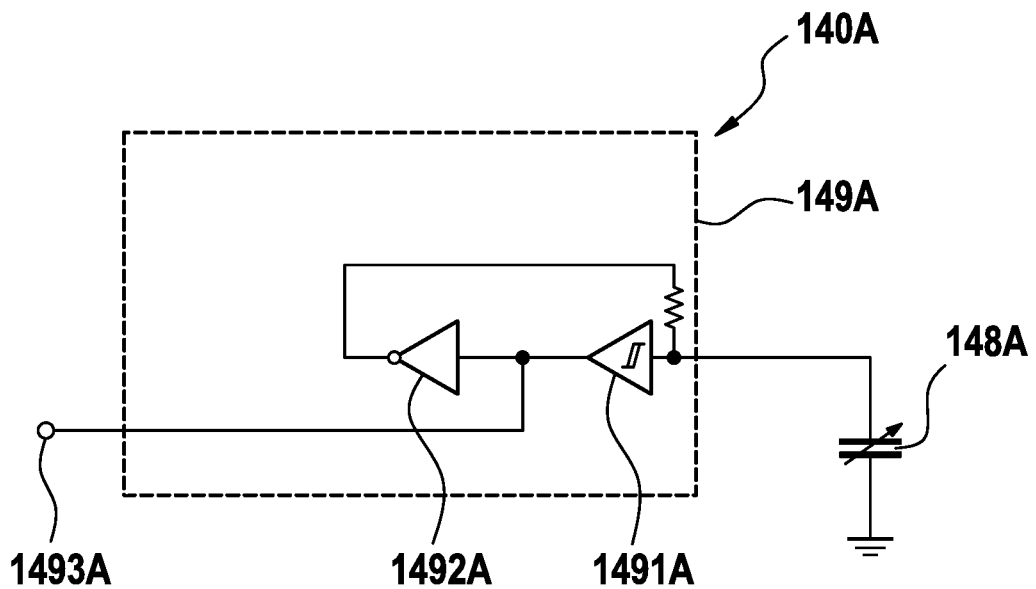
FIG. 6 is a principle sketch of the control circuit coupled to the variable capacitor formed by the first and second electrodes.

FIG. 6 is a simplified depiction of the components of an example treatment force measurement unit 140A comprising a microprocessor 149A and a variable capacitor 148A. It is understood that an energy source is present to provide energy for the microprocessor 149A and also a voltage source to be applied at the variable capacitor 148A. When the system is powered, an output of a Schmitt trigger 1491A will be low and an output of an inverter 1492A will be high and thus charging the variable capacitor 148A occurs. When the value of the voltage over the variable capacitor 148A reaches an upper threshold value of the Schmitt trigger 1491A, the Schmitt trigger 1491A switches its output to high and the inverter 1492A switches its output to low. The variable capacitor 148A then discharges up to the lower threshold of the Schmitt trigger 1491A. The cycle restarts and a periodic signal is generated at output 1493A. The frequency of this periodic signal is a measure of the current capacitance of the variable capacitor 148A.

Figure 7:
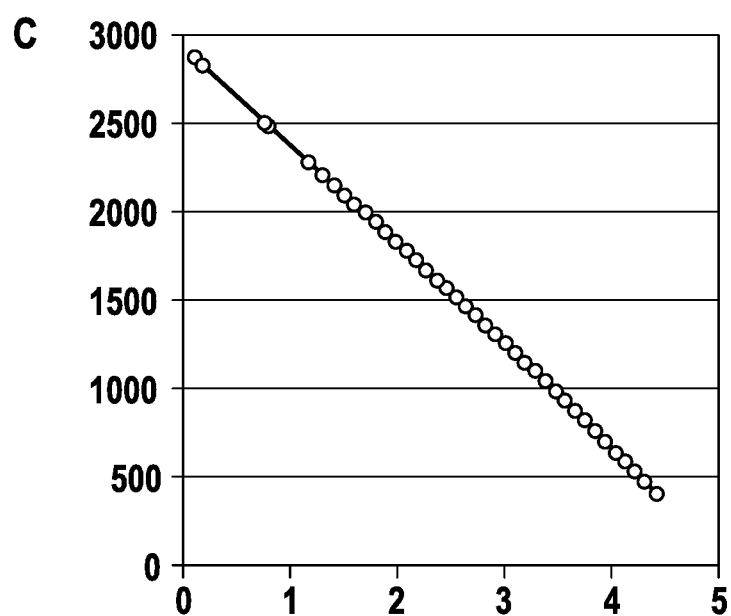
FIG. 7 is a schematic depiction showing the experimentally found relationship between the applied force and the parameter indicative of the capacitance between the first and second electrodes determined by the control circuit.

FIG. 7 is a depiction of the relationship between the force $F_a$ applied at the moveable electrode as in a setup shown in FIGS. 3, 4, and 5 and the value of a parameter C indicative of the capacitance of the variable capacitor determined by a control circuit comprising a microprocessor as described with respect to FIG. 6. The parameter C is here the number of charge/discharge cycles counted per predetermined time period. It can be seen that the relationship is of a satisfying linearity.

Figure 8A:
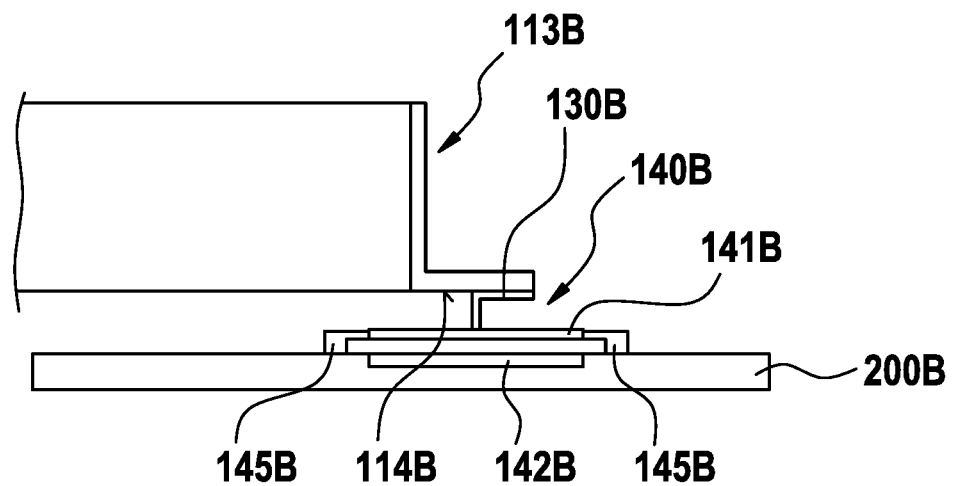
FIG. 8A is a schematic depiction of an example of a fixedly secured connection between a contact face of the treatment head and a force transmission element that itself is secured at the second electrode.
Figure 8B:
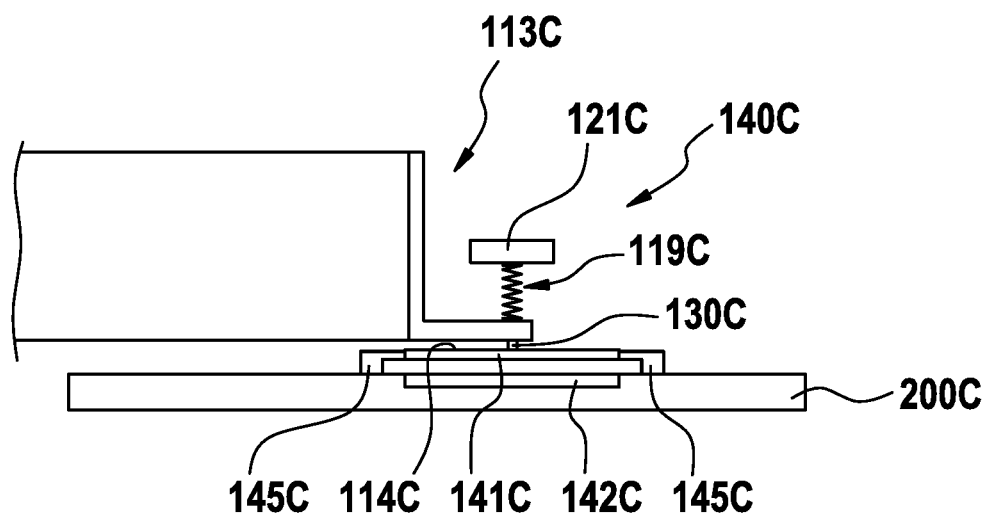
FIG. 8B is a schematic depiction of an example of a forced abutment of a contact face of the treatment head at a force transmission element that itself is secured at the second electrode.

FIG. 8A and FIG. 8B are schematic depictions of two example embodiments of a treatment force measurement unit 140B and 140C together with some further features of an example personal hygiene device. In both figures, an arm portion 113B, 113C comprises an L-shaped end portion, where on a bottom side of the L-shaped end portion a contact face 114B, 114C is provided that is in contact with a force transmission element 130B, 130C. The force transmission element 130B, 130C is in each case connected with a moveable electrode 141B or 141C, respectively. The moveable electrode 141B, 141C is mounted at a carrier 200B, 200C via a spring unit 145B, 145C. A fixed electrode 142B, 142C is arranged on the carrier 200B, 200C (e.g. the carrier 200B, 200C may be a PCB and the fixed electrode 142B, 142C may be a metallized region). The essential two differences between the two example embodiments shown in FIGS. 8A and 8B are the different force transmission elements and how the contact face 114B, 114C stays in contact with the force transmission element 130B, 130C.

In FIG. 8A, the force transmission element 130B has a general L-shape, where the short leg of the L is connected with the moveable electrode 141B so that a basically point-like force transmission to the moveable electrode 141B is established. In the embodiment of FIG. 8A, the longer leg of the L-shaped force transmission element 130B is fixedly secured at the contact face 114B of the arm portion 113B, e.g. by means of gluing, welding, snap-fitting, screwing etc. This shall basically not exclude that the force transmission element 130B and the arm portion 113B are integrally made. It may ease the assembly of the unit if the force transmission element 130B is realized as a separate element that is later fixedly secured at the arm portion 113B.

In FIG. 8B, the force transmission element 130C is schematically indicated by a small square, which of course shall include that the force transmission element may be a spherical object as previously discussed. In the embodiment shown in FIG. 8B, the contact face 114C is in contact with the force transmission element 130C by means of a biasing force introduced by a biasing element 119C, e.g. a biasing spring element being arranged between the here L-shaped end portion of the arm portion 113B and a handle housing 120C. The biasing force is typically chosen to be large enough so that external forces due to changing orientation in earth's gravitation field or vibrations are not able to separate the contact face 114C and the force transmission element 130C.

As is best shown in FIGS. 2 and 4, each of the spring arms of the spring unit comprises a spring that biases the movable (second) electrode for a movement relative to the fixed (first) electrode, as is previously described. In the embodiment of FIG. 2, at least two spring arms of the spring unit 45A, attached to the movable electrode 41A, are spaced apart from one another and positioned equidistantly from the force transmission element 30A thereby biasing the movable electrode 41A relative to the fixed electrode 42A. In the embodiment of FIG. 4, four essentially flat S-shaped spring arms of the spring unit 145A-145D, extending in the same (first) plane in which the movable electrode 141 is extending, are spaced apart from one another and positioned, equidistantly from the force transmission element 130, at the four corners of the essentially planar and rectangular electrode 141.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A toothbrush comprising:
   a handle;
   a treatment head mounted for movement relative to the handle against a spring force when a treatment force is applied in at least one treatment direction to the treatment head; and
   a treatment force measurement unit for determining an applied treatment force,
      the treatment force measurement unit comprising a capacitive force sensor having a first electrode fixedly mounted with respect to the handle, and a second electrode movably mounted at a distance from the first electrode and supported by a spring unit comprising at least two spring arms, each comprising a spring, attached to the second electrode and arranged to bias the second electrode relative to the first electrode,
      the treatment force measurement unit further comprising a control circuit for determining at least one parameter indicative of a capacitance between the first and second electrodes;
   wherein the second electrode is mechanically coupled with the treatment head and is arranged to be moved relative to the first electrode when the treatment force is applied to the treatment head.

2. The toothbrush of claim 1, wherein the second electrode is essentially planar at least on a front side facing the first electrode and extends in a first plane, wherein a force transmission element is secured to a backside of the second electrode opposite to the front side at about a center point of an area of the second electrode, and wherein the force transmission element is arranged to allow an essentially point force transmission onto the second electrode.

3. The toothbrush of claim 1, wherein the treatment head is arranged for movement around a pivot axis that is essentially perpendicular to a length extension direction of the toothbrush.

4. The toothbrush of claim 1, wherein the spring unit is arranged so that the second electrode moves under an application of a force of between 25 μm/N and 50 μm/N.

5. The toothbrush of claim 1, wherein the second electrode comprises a reinforcement element for reducing a deformation of the second electrode under an application of the treatment force.

6. The toothbrush of claim 1, wherein a front side of the second electrode facing the first electrode is arranged with a distance of between 150 μm and 500 μm to an opposing front surface of the first electrode.

7. The toothbrush of claim 1, wherein a capacitor formed by the first electrode and the second electrode is part of an oscillating circuit, and the control circuit is arranged to determine a resonance frequency of the oscillating circuit as the at least one parameter indicative of the capacitance between the first electrode and the second electrode.

8. The toothbrush of claim 1, further comprising a carrier on which the second electrode is mounted.

9. The toothbrush of claim 1, wherein the control circuit is arranged to control an indication element in dependence on an at least one parameter being determined.

10. The toothbrush of claim 1, wherein the spring unit is arranged so that the second electrode moves under an application of a force of between 35 μm/N and 40 μm/N.

11. The toothbrush of claim 2, wherein the force transmission element comprises is an essentially spherical object.

12. The toothbrush of claim 2, wherein the treatment head is fixedly connected with an arm portion that is arranged within the handle and that has a contact face that abuts the force transmission element, wherein the contact face abuts the force transmission element under a biasing force or the contact face is fixedly secured at the force transmission element.

13. The toothbrush of claim 2, wherein the spring unit extends in the first plane, and wherein the at least two spring arms are integral with the second electrode.

14. The toothbrush of claim 2, wherein the at least two spring arms of the spring unit are spaced apart from one another and positioned equidistantly from the force transmission element.

15. The toothbrush of claim 13, wherein each of the at least two spring arms comprises a spring selected from a group consisting of essentially flat S-shaped springs, N-shaped springs, M shaped springs, L-shaped springs, J shaped springs, U-shaped springs, and any combination thereof.

16. The toothbrush of claim 13, wherein each of the at least two spring arms has a first end connected with the second electrode and a second end connected with a mounting pad, and wherein the mounting pad extends in the first plane and is integral with a respective spring arm.

17. The toothbrush of claim 13, wherein the spring unit comprises at least four spring arms spaced apart from one another.

18. The toothbrush of claim 4, wherein the spring unit is arranged so that the second electrode moves under the application of the force of between 30 μm/N and 45 μm/N.

19. The toothbrush of claim 8, wherein the first electrode comprises by a metallized area on the carrier.

20. The toothbrush of claim 8, wherein the carrier comprises a printed circuit board.

21. The toothbrush of claim 17, wherein the second electrode has an essentially rectangular shape having four corners, and wherein the at least four spring arms extend from four corners of the second electrode.

* * * * *